US 8,109,077 B2

(12) United States Patent
Reba et al.

(10) Patent No.: US 8,109,077 B2
(45) Date of Patent: Feb. 7, 2012

(54) DUAL INJECTOR SYSTEM FOR DIESEL EMISSIONS CONTROL

(75) Inventors: Peter Joseph Reba, Waterbury, CT (US); Gregory John Baccari, Wilmington, NC (US); Thomas V. Eldredge, Monroe, CT (US); James M. Valentine, Fairfield, CT (US)

(73) Assignee: Tenneco Automotive Operating Company Inc., Lake Forrest, IL (US)

( * ) Notice: Subject to any disclaimer, the term of this patent is extended or adjusted under 35 U.S.C. 154(b) by 1104 days.

(21) Appl. No.: 11/870,012

(22) Filed: Oct. 10, 2007

(65) Prior Publication Data
US 2008/0087008 A1    Apr. 17, 2008

Related U.S. Application Data

(60) Provisional application No. 60/851,104, filed on Oct. 11, 2006.

(51) Int. Cl.
*F01N 3/00* (2006.01)
*F01N 3/10* (2006.01)

(52) U.S. Cl. ........... 60/286; 60/274; 60/295; 60/301; 60/303

(58) Field of Classification Search .......... 60/273, 60/286, 295, 297, 301, 303, 274, 277
See application file for complete search history.

(56) References Cited

U.S. PATENT DOCUMENTS

| 6,048,510 | A | 4/2000 | Zauderer |
|---|---|---|---|
| 6,125,629 | A | 10/2000 | Patchett |
| 6,182,444 | B1 | 2/2001 | Fulton et al. |
| 6,361,754 | B1 | 3/2002 | Peter-Hoblyn et al. |
| 6,761,025 | B1 | 7/2004 | Gladden |
| 6,823,663 | B2 | 11/2004 | Hammerle et al. |
| 7,047,784 | B2 | 5/2006 | Kohn |
| 7,264,785 | B2 | 9/2007 | Blakeman et al. |
| 2003/0109047 | A1 | 6/2003 | Valentine |
| 2005/0235632 | A1* | 10/2005 | Tarabulski et al. ............. 60/282 |
| 2006/0010857 | A1 | 1/2006 | Hu et al. |
| 2006/0013704 | A1 | 1/2006 | Sawada et al. |
| 2006/0086080 | A1* | 4/2006 | Katogi et al. ............. 60/278 |
| 2006/0248881 | A1 | 11/2006 | Yokota |

FOREIGN PATENT DOCUMENTS

| DE | 199 24 215 | 12/1999 |
|---|---|---|
| EP | 1 027 919 | 8/2000 |
| JP | 11343834 A | * 12/1999 |
| JP | 2000008833 A | * 1/2000 |
| WO | WO2004/058642 | 7/2004 |
| WO | WO 2006/066043 | 6/2006 |

OTHER PUBLICATIONS

Hirota et al., Machine Translation of JP 11-343834 A, Dec. 14, 1999.*
Hirota et al., English Abstract of JP 11-343834 A, Dec. 14, 1999.*

* cited by examiner

*Primary Examiner* — Thomas Denion
*Assistant Examiner* — Audrey K Bradley
(74) *Attorney, Agent, or Firm* — Harness, Dickey & Pierce, PLC

(57) ABSTRACT

The present invention provides methods and apparatus for injecting fluid, such as an aqueous urea solution, into an exhaust stream in order to reduce oxides of nitrogen (NOx) emissions from diesel engine exhaust. More particularly, the present invention provides a dual-injector system for diesel emissions control and corresponding methods.

20 Claims, 4 Drawing Sheets

DUAL INJECTOR SYSTEM FOR DIESEL EMISSIONS CONTROL

CROSS-REFERENCE TO RELATED APPLICATIONS

This application claims the benefit of, under 35 U.S.C. 119(e), U.S. Provisional Patent Application No. 60/851,104, filed Oct. 11, 2006, which application is hereby incorporated by reference herein.

FIELD OF THE INVENTION

The present invention relates generally to the reduction of emissions produced by diesel engines. In particular, the present invention provides methods and apparatus for injecting fluid, such as an aqueous urea solution or hydrocarbons such as diesel fuel, into an exhaust stream in order to reduce oxides of nitrogen (NOx) emissions from diesel engine exhaust. More particularly, the present invention provides a dual-injector system for diesel emissions control and corresponding methods.

BACKGROUND OF THE INVENTION

The control of diesel engine emissions through aftertreatment systems typically involves the use of technology such as a diesel particulate filter for control of particulates and a lean-NOx trap (LNT) or selective catalytic reduction (SCR) for NOx control. Hydrocarbon (HC) based reagents like diesel fuel can be injected into a diesel engine exhaust to assist in regenerating and burning off soot collected in a Diesel Particulate Filter (DPF) or to provide fuel rich conditions across a LNT for the chemical reduction of NOx stored as NO2. Reagents such as urea or ammonia solutions in water are generally used to chemically convert NOx across a vanadium, precious metal or zeolite catalyst to harmless nitrogen gas. These systems all rely on the precise control and injection of reagents into the exhaust across a broad range of reagent flow rates tied to engine operating and aftertreatment operating conditions. Further, the varying engine sizes from less than 2 liters in passenger cars up to 16 liters in heavy duty trucks each requires different amounts of metered reagent to be injected into the exhaust leading to a wide array of differing injector sizes and designs for each different application, thereby increasing production, inventory and service costs.

It would be advantageous to provide a simple system with a controller able to take engine signals such as rpm, load, exhaust temperature or backpressure from an engine ECU and to control one or more pumps feeding one or more injectors injecting HC or urea separately or concurrently at one or more locations in the exhaust pipe of a diesel engine.

Some systems are known that include a controller for injecting a reagent based on parameters such as temperature and pressure. For example, U.S. Pat. No. 6,361,754 to Peter-Hoblyn et al. ("the Peter-Hoblyn patent") discloses a system for reducing emissions that includes a controller for modulating the flow or pulse of reagent injection ports or nozzles. However, the system disclosed in the Peter-Hoblyn patent does not provide for the injection of two different reagents and, in fact, only injects gaseous ammonia formed from the hydrolysis of aqueous urea in an upstream process.

U.S. Pat. No. 7,264,785 to Blakeman et al. ("the Blakeman patent") describes a system for selective catalyst reduction including means for injecting a nitrogenous reducing agent, ammonia, at multiple locations in an exhaust stream. The Blakeman patent further discloses a means for controlling the introduction of the ammonia. However, the disclosed system only injects one reducing agent into the exhaust stream, and only in one location at any given time. In particular, the system injects ammonia in a first area of exhaust stream then switches to a second area when a particular temperature is reached. The system described in the Blakeman patent also uses gaseous ammonia and requires a complex catalytic conversion of urea to gaseous ammonia across a hydrolysis catalyst. The Blakeman patent further describes a complex means of injecting urea when the engine is keyed off and storing urea in a catalyst until the engine is keyed on.

International Patent Application Publication WO 2004/058642 to Valentine ("the Valentine application") discloses a NOx control system for internal combustion engines. The system includes two or more catalysts and injectors for injecting a reagent in two different zones upstream of the catalysts. A controller takes measured parameters and compares them to reference values to create control signals that can optimize reagent utilization. In particular, the controller switches the location of reagent from the first zone to the second as necessary based on gas temperatures. As in the other cited prior art, only a single reagent is employed. Furthermore, the Valentine application does not disclose how the wide range of reagents needed for engine operating conditions could be met given the single injector in front of each catalyst. The temperature limitations of each catalyst would prevent simultaneous injection using both injectors for high flow rates.

It would also be advantageous to provide an injector having the capability of a wide range of flow rates from 0.25 to 600 grams/min. It would be further advantageous to be able to provide two injectors which in combination are capable of delivering up to 1200 grams/min. It would be still further advantageous to be able to change the flow range by physically changing only a removable orifice plate with a range of orifice sizes (0.004-0.030") and by varying operating parameters of percentage on-time (1%-95%), or operating frequency (1-10 Hz) or operating pressure (60-120 psi). In addition, it would be advantageous if such an injector did not require air for atomization or cooling and was constructed of materials capable of injecting either HC or urea based reagents into exhaust gas having temperatures of 150 C. to 800 C. with a minimum of dwell spaces to prevent deposits from forming or collecting in the injector. It would further be advantageous if injection of reagents could be done without complex catalytic pre-treatment of reagents.

The methods and apparatus of the present invention provide the foregoing and other advantages.

SUMMARY OF THE INVENTION

The present invention provides methods and apparatus for injecting fluid, such as an aqueous urea solution or hydrocarbons such as diesel fuel, into an exhaust stream in order to reduce oxides of nitrogen (NOx) emissions from diesel engine exhaust. More particularly, the present invention provides a dual-injector system for diesel emissions control and corresponding methods.

Commonly owned U.S. patent application Ser. No. 11/112,039 filed on Apr. 22, 2005 and U.S. Provisional Patent Application No. 60/809,918 filed on May 31, 2006 describe example embodiments of injectors useful for HC or urea injection which are adjustable in flow rate by changing feed pressure, circulation rate, on time, frequency or orifice size. The present invention expands on these disclosures by teaching the application of two injectors controlled by a single ECU with either a single or dual pump to deliver combined flow rates of less than 20 grams/min to 1200 grams/min.

Objectives of the present invention are achieved by providing a system for controlling diesel emissions with two or more reagent injectors, including a first injector for injecting a first reagent into an exhaust stream from a diesel engine, wherein the first injector is positioned upstream of at least one of a diesel particulate filer and a lean NOx trap, a second injector for injecting a second reagent into the exhaust stream, wherein the second injector is positioned upstream of a selective catalytic reduction catalyst, and wherein the second reagent is different from the first reagent, a first pump for providing the first reagent to the first injector, a second pump for providing the second reagent to the second injector, and a control unit for controlling the injection of both the first reagent and the second reagent.

In some embodiments, the control unit generates at least one control signal based on engine operating parameters. In some embodiments, the control unit controls the injection by transmitting one or more control signals to each of the first pump and the second pump, and/or by transmitting one or more control signals to each of the first injector and the second injector.

Other objectives of the present invention are achieved by providing a method for controlling diesel emissions using two or more reagent injectors, including the steps of detecting an engine load of a diesel engine, injecting a first reagent into an exhaust stream of the diesel engine from a first injector at a first injection frequency when the detected engine load is at or below a first threshold value, increasing the injection frequency of the first injector to a second injection frequency when the detected engine load increases above the first threshold value, and initiating the injection of a second reagent into the exhaust stream from a second injector when the detected engine load increases above a second threshold value, and injecting the second reagent from the second injector at the second injection frequency and injecting the first reagent from the first injector at the second injection frequency when the detected engine load is above the second threshold value.

In some embodiments, the first injection frequency is about 1.5 Hz or less, the first threshold value is about 15%, the second injection frequency is at least about 10 Hz, and the second threshold value is about 40%.

Further provided is a method of controlling the injection of reagent using two injectors, including providing one or more fluid supply pumps for providing at least one reagent to a lead injector and a lag injector at pressures of between about 60 psi and 120 psi, delivering a first reagent from the lead injector at a flow rate of about 0.25 to 600 grams/minute into an exhaust stream of a diesel engine, the exhaust stream including one or more aftertreatment catalysts for NOx and particulate control, delivering a second reagent from the lag injector at a flow rate of about 0.25 to 600 grams/minute into the exhaust stream, wherein the second reagent is different from the first reagent, controlling the delivery of each of the first reagent and the second reagent from a single control unit, and wherein each of the lead and lag injectors includes a single fluid pulse width modulated injector having a swirl plate for atomization to deliver droplets of about 40 to about 80 micron SMD.

Other objects, features and advantages according to the present invention will become apparent from the following detailed description of certain advantageous embodiments when read in conjunction with the accompanying drawings in which the same components are identified by the same reference numerals.

BRIEF DESCRIPTION OF THE DRAWINGS

The present invention will hereinafter be described in conjunction with the appended drawing figures, wherein like reference numerals denote like elements, and.

DETAILED DESCRIPTION OF THE INVENTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 1:
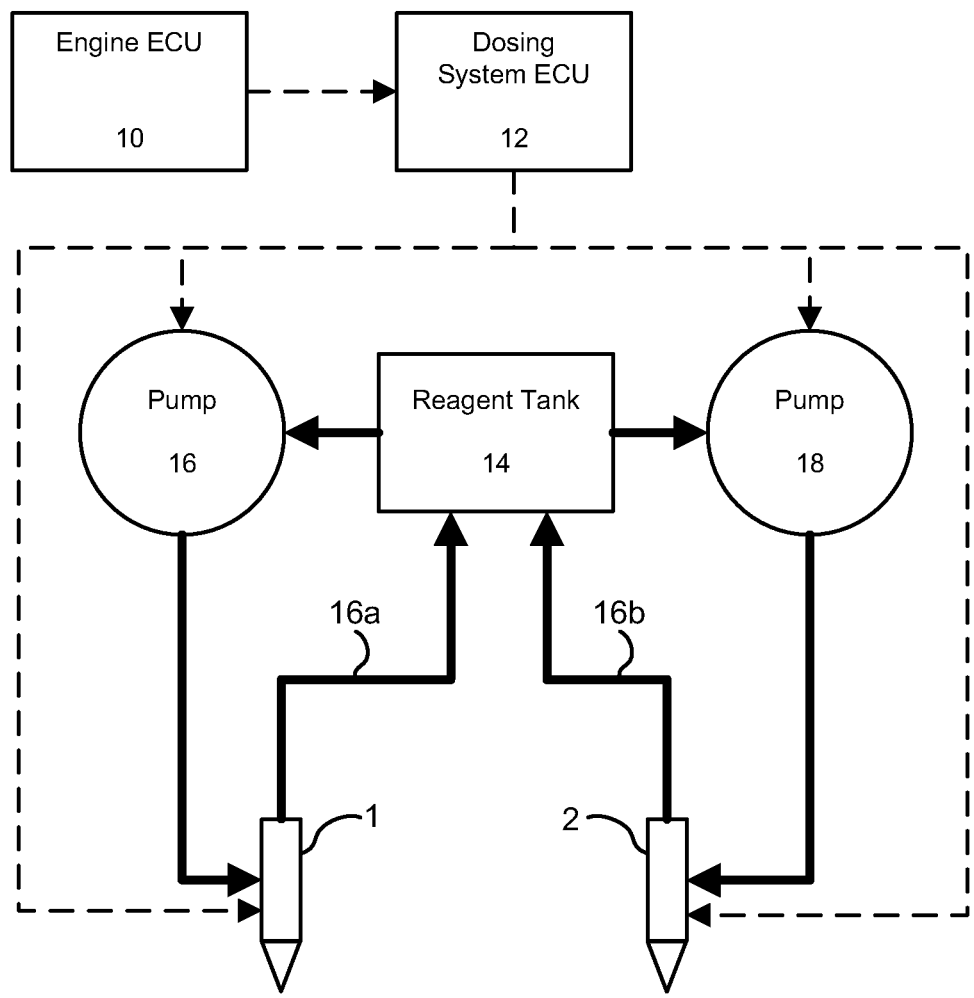
FIG. 1 shows a block diagram of an example embodiment of the invention.

FIG. 1 shows a block diagram of an example embodiment of the present invention. The dosing system ECU 12 contains a software program capable of driving two 12V DC positive displacement pumps 16, 18, each of which feeds respective injectors 1, 2 containing similar or different sized orifice plates which may be operated at similar or different pressures, frequencies and percentage on-time. The ECU 10 may supply engine operating parameters or a dosing signal to a dosing system ECU 12, which controls the pumps 16, 18 and the injectors 1, 2. The pumps 16, 18 may be supplied reagent from a single tank 14 as shown in FIG. 1. In a further example embodiment, each pump 16, 18 may be supplied reagent from separate tanks, and each of the tanks may contain a different reagent as discussed in detail below. Orifice plates for the injectors 1, 2 may be selected from sizes ranging from 0.004-0.030 inches in diameter and operating pressures are in the range of 60-120 psi with circulation rates of 2.5-10 gals/hr. Operation of the pulse width modulated injectors (e.g., via the engine ECU 10 or dosing system ECU 12) may be varied from as low as 1% on-time to 95% on-time and frequencies may be varied from 1-10 Hz. These variables are selected to provide an average droplet size from the injectors 1, 2 in the range of 40-80 micron SMD. In FIG. 1, the dashed lines denote control signal paths and solid lines denote fluid lines for reagent.

While FIG. 1 shows two injectors 1, 2 being fed reagent from tank 14 via pumps 16, 18, it should be appreciated that where the same reagent is being fed to injectors 1, 2, a single pump may be used to supply a common reagent to both injectors 1, 2.

In a further example embodiment, reagent may also be used to cool the injectors 1, 2. In such a case this reagent may be returned to the reagent tank 14 via return lines 16a and 16b, respectively.

It is known that injectors of the type suitable for use with the present invention may have variations of +/−20% in flow when operated at low flow rates due to inherent design features. Therefore it is desirable to operate such injectors above 10% on time as much as possible to have better flow control precision.

Figure 2A:
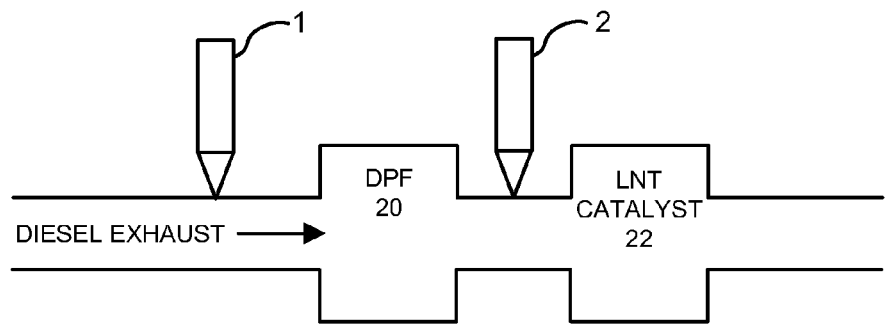
FIGS. 2A-2D are block diagrams showing the positioning of dual injectors in various example embodiments of the present invention.

In a further example embodiment as shown in FIG. 2A, where the reagent is similar, for example hydrocarbon for both DPF regeneration and injection into a LNT, then a single pump can be used to feed two injectors, which are selected and operated to meet the desired flow range. In this case, a hydrocarbon reagent is fed to the first injector 1 positioned before the DPF 20 and also to the second injector 2 positioned before the LNT 22.

Figure 2B:
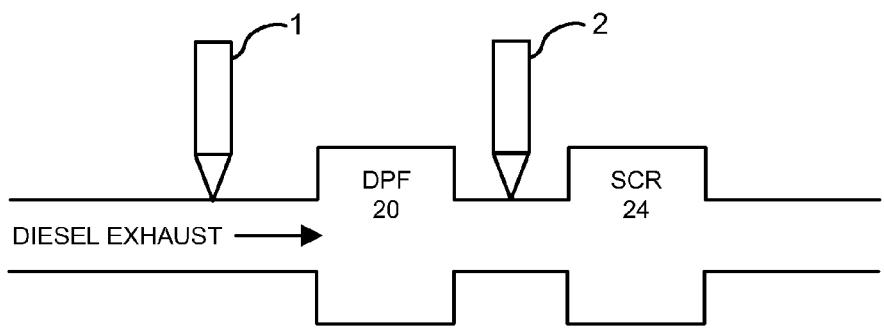

In another example embodiment of the present invention as shown in FIG. 2B, two different reagents may be used. For example, hydrocarbons may be injected into the diesel exhaust stream via one injector (e.g., injector 1) positioned before the DPF 20 for DPF regeneration and urea may be injected by the other injector (e.g., injector 2) positioned before the SCR catalyst 24 for SCR. In such an example embodiment, two pumps (each with its own reagent tank having HC and SCR reagents, respectively) may be used, each of which pump is dedicated to a specific injector which has been sized and is operated to deliver the desired flow rate of reagent based on signals from the engine ECU 10 and/or Dosing system ECU 12. The engine ECU 10 or the dosing system ECU 12 may be designed to vary each injector operating time and frequency based on the application requirements for individual injectors.

Figure 2C:
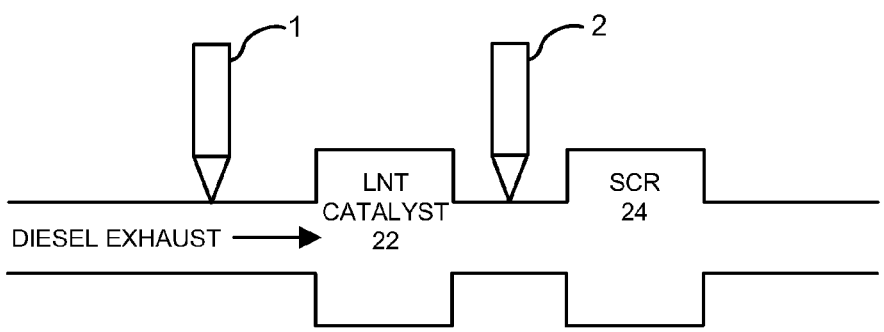

A further example embodiment of the present invention where two different reagents may be used is shown in FIG. 2C. In this example, hydrocarbons may be injected into the diesel exhaust stream via one injector (e.g., injector 1) positioned before an LNT and urea may be injected by the other injector (e.g., injector 2) positioned before SCR catalyst 24 for SCR. In such an example embodiment, two pumps (each with its own reagent tank having HC and SCR reagents, respectively) may be used, each of which pump is dedicated to a specific injector which has been sized and is operated to deliver the desired flow rate of reagent based on signals from the engine ECU 10 and/or Dosing system ECU 12. The engine ECU 10 or the dosing system ECU 12 may be designed to vary each injector operating time and frequency based on the application requirements for individual injectors.

In the example embodiment shown in FIG. 2C, both injectors 1 and 2 may be operated at the same time. Alternatively, the system may turn one injector on while the other injector is off, depending on engine operating conditions. Further, injector 1 may be turned off initially and the system may be operated with only injector 2 injecting urea into the SCR catalyst 24. An alarm may sound when urea in the tank supplying the pump for injector 2 reaches a predetermined low level. Once the alarm is activated, the ECU 10 and/or Dosing system ECU 12 may instruct injector 2 to stop injecting urea. However, the urea remaining in the tank may be circulated through injector 2 after the alarm sounds to cool injector 2. At the same time as injector 2 is shut off, the ECU 10 and/or Dosing system ECU 12 may turn on injector 1 and injector 1 will begin injecting hydrocarbons into the LNT 22 until the urea tank is refilled. During the time when injector 1 is turned off, hydrocarbons may be circulated through it for cooling purposes. When using a system with both an LNT 22 and an SCR catalyst 24, it may be advantageous to place the LNT 22 before the SCR catalyst 24 as shown in FIG. 2C, as the SCR catalyst 24 may make use of ammonia byproducts formed in reactions of hydrocarbons across the LNT 22. However, it is conceivable to implement such a system with the SCR 24 placed in front of the LNT 22.

In another example embodiment of the present invention, where high volumes of reagent may be needed such as in a large heavy duty engine, the dual pump and dual injector configuration may be used to achieve total flow rates of up to 1200 grams/min. In such an example embodiment, the first injector 1 is designated as a lead injector and the second injector 2 is a lag injector. The lead injector may be sized and selected to provide minimum to mid range flow by operating at a low pulse width of 1-2 HZ and low percentage on-time of 1-5% and up to 15-50% on time before the frequency is automatically changed to 10 Hz, thereby increasing flow from the lead injector and maximizing its operation in the optimum flow range. At the point of 40-50% of maximum flow from the lead injector 1, the second (lag) injector 2 may be initiated at a 10 Hz frequency to deliver any additional flow called for by the system control. Both injectors may have on-time increased in parallel until the maximum flow rate is achieved based on demand signals from the ECU.

Numerous situations exist where an embodiment of the dual injector system of the present invention may be beneficial. For example, in the case where HC injection is used to regenerate a DPF on an infrequent basis the injection rates can vary from 1-5 grams/min to 400-600 gamin for a period of 1-5 minutes every 300 miles. During periods when injection is not required for regeneration of the DPF, the lead injector may continuously circulate hydrocarbons through the injector to keep it cool and to prevent carbon deposits in the injector. The second injector, fed from a dedicated urea circulation pump, may be used to inject urea reagent across an SCR catalyst at rates determined by NOx emitted as a function of engine load and speed. Flow rates of 0.25 gr/min to 100 gr/min for light duty applications and from 20 gr/min in 20 qr/min to 600 gr/min for heavy-duty applications are typical and may be selected by choice in orifice size, operating frequency, percent on time and/or pump pressure.

In another example, an SCR system may require a wide range of flow rates from 10-20 gr/min at low load to 1000 gr/min at high load. A typical 0.025 orifice injector can only deliver approximately 500 gr/min at 10 Hz and 90% on time. When operated at 1.5% on time it can achieve 20 gr/min. In this case, the lead injector may be operated using changes in frequency and on time to achieve 20-500 gr/min at which point the lag injector is initiated in parallel operation to the lead injector to provide additional urea flow starting at about 100 gr/min and 10 Hz. The percentage on time for both injectors may be increased to a maximum of 95% to deliver up to the total 1000 gr/min of urea. In some embodiments, the operating or pump pressure is also varied to control injection volume. In particular, the pump pressure may be increased above about 80 psig helps to reach the high volumes.

Figure 2D:
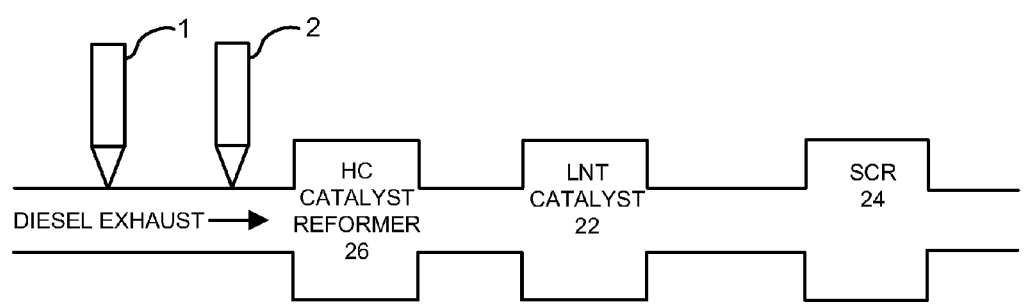

Testing results for an example implementation of the dual injector system as shown in FIG. 2D of the present invention are provided below. In this example implementation, operating results were obtained for a HC based system designed and programmed to deliver 20 gr/min or less of reagent up to 800 gr/min or more of reagent for injection in front of a lean NOx trap 22 or upstream HC reformer 26 used to convert HC reagents into more reactive species upstream of a LNT 22. In this example two 0.028 orifice injectors 1 and 2 are each positioned before the LNT 22 and HC reformer 26, and are each fed by a separate pump at 80-110 psi line pressure and a single ECU is used to control the frequency and percent on-time of each injector based on a program developed to match reagent injection to an engine load signal or comparable engine ECU reagent dosing signal. An SCR catalyst 24 may be positioned downstream of the LNT 22 to make use of ammonia byproducts formed in reactions of hydrocarbons across the LNT 22.

Dual Injector Operating Sequence

Increasing load conditions: As indicated in Table 1 below, at minimum load (1%) injector 1 will begin injection at a frequency of 1.5 Hz and 17 grams/min. As load is increased from 1% to 15% the injector frequency will remain at 1.5 Hz while the flow rate of injector 1 changes proportionally from 17 to 125 grams per minute. If load continues to increase past 15%, the injector frequency will switch from 1.5 Hz to 10 Hz within approximately 60 milliseconds. Injector 1, operating at 10 Hz will continue to provide the requested flow rate up to a load of 40% equal to 330 grams per minute. As load increases beyond 40%, injector 2 will start injecting at a frequency of 10 Hz, and the flow will be split 78% (264 g/m)

from injector 1 and 22% (72 g/m) from injector 2. As load increases from 40% to 100% the flow rate will increase faster on injector 2 than on injector 1 resulting in a 50/50 split flow rate between injectors 1 and 2 at 100% load with a total flow of 816 grams per minute.

It should be appreciated that the different behavior characteristics of injector performance for increasing and decreasing loads is intended to reduce "short cycling" of the #2 injector during rapidly changing load conditions while maintaining optimum spray quality of both injectors.

TABLE 1

TOTAL SYSTEM FLOW RATE TEST RESULTS

INCREASING LOAD TEST RESULTS

| | \multicolumn{9}{c}{PERCENT LOAD} | | | | | | | | |
|---|---|---|---|---|---|---|---|---|---|
| | 1% | 14% | 16% | 25% | 39% | 41% | 50% | 75% | 100% |
| INJECTOR 1A (1.5 Hz) | 16.8 | 106.3 | 0 | 0 | 0 | 0 | 0 | 0 | 0 |
| INJECTOR 1B (10 Hz) | 0 | 0 | 127.1 | 213.8 | 330.3 | 267.5 | 292.6 | 354.9 | 421.5 |
| INJECTOR 2 | 0 | 0 | 0 | 0 | 0 | 74.1 | 123.5 | 271.9 | 401.8 |
| TOTAL VOLUME INJECTED g/m | 16.8 | 106.3 | 127.1 | 213.8 | 330.3 | 341.6 | 416.1 | 626.8 | 823.3 |

DECREASING LOAD TEST RESULTS

| | \multicolumn{9}{c}{PERCENT LOAD} | | | | | | | | |
|---|---|---|---|---|---|---|---|---|---|
| | 100% | 75% | 50% | 41% | 39% | 23% | 22% | 16% | 14% | 1% |
| INJECTOR 1A (1.5 Hz) | 0 | 0 | 0 | 0 | 0 | 0 | 0 | 0 | 0 | 17 |
| INJECTOR 1B (10 Hz) | 420.2 | 353.8 | 293.4 | 265.6 | 252.3 | 99.7 | 169.4 | 126.2 | 105 | 0 |
| INJECTOR 2 | 401.1 | 272.2 | 124.2 | 73.2 | 73.5 | 74.2 | 0 | 0 | 0 | 0 |
| TOTAL VOLUME INJECTED g/m | 821.3 | 626 | 417.6 | 338.8 | 325.8 | 173.9 | 169.4 | 126.2 | 105 | 17 |

TESTING PERFORMED ON ASSEMBLED & PROGRAMMED SYSTEM USING CAN LOAD OVERIDE SIGNAL TO INITIATE INJECTION.

Note: Injector 1 will operate at 1.5 Hz for low load (<15%) and 10 Hz for loads greater than 15%. Injector 2 will operate at 10 Hz for all operating conditions.

Decreasing load conditions: As load decreases from 100% to 40% the injectors share the load exactly the same as on a load increase going from a 50/50 split at full load to a split of 78% from injector 1 (262 g/m) and 22% from injector 2 (71 g/m) at 41% load with both injectors operating at a frequency of 10 Hz. As load decreases between 40% and 21% injector 2 will continue to inject at a frequency of 10 Hz and maintain a flow of 71 grams/min. Injector 1 will inject at a frequency of 10 Hz and reduce its flow rate proportionally between these points dropping from 253 grams per minute at 40% load to 90 grams per minute at 21% load. When load drops below 21% injector 2 will stop injecting and injector 1 will continue to inject at a frequency of 10 Hz and provide the total requested dose of 162 grams per minute at 20% load down to 95 grams per minute or 12% load. Below 12% load the frequency of injector 1 will change from 10 Hz to 1.5 Hz within 160 milliseconds of the decrease command. Injector 1 will continue to inject the requested dose at a frequency of 1.5 Hz and decrease the dose proportionally from 95 grams per minute at 12% load to 17 grams per minute at 1% load.

Note: Injector 1 will operate at 1.5 Hz for low load (<12%) and 10 Hz for loads greater than 12%. Injector 2 will operate at 10 Hz for all operating conditions.

Figure 3:
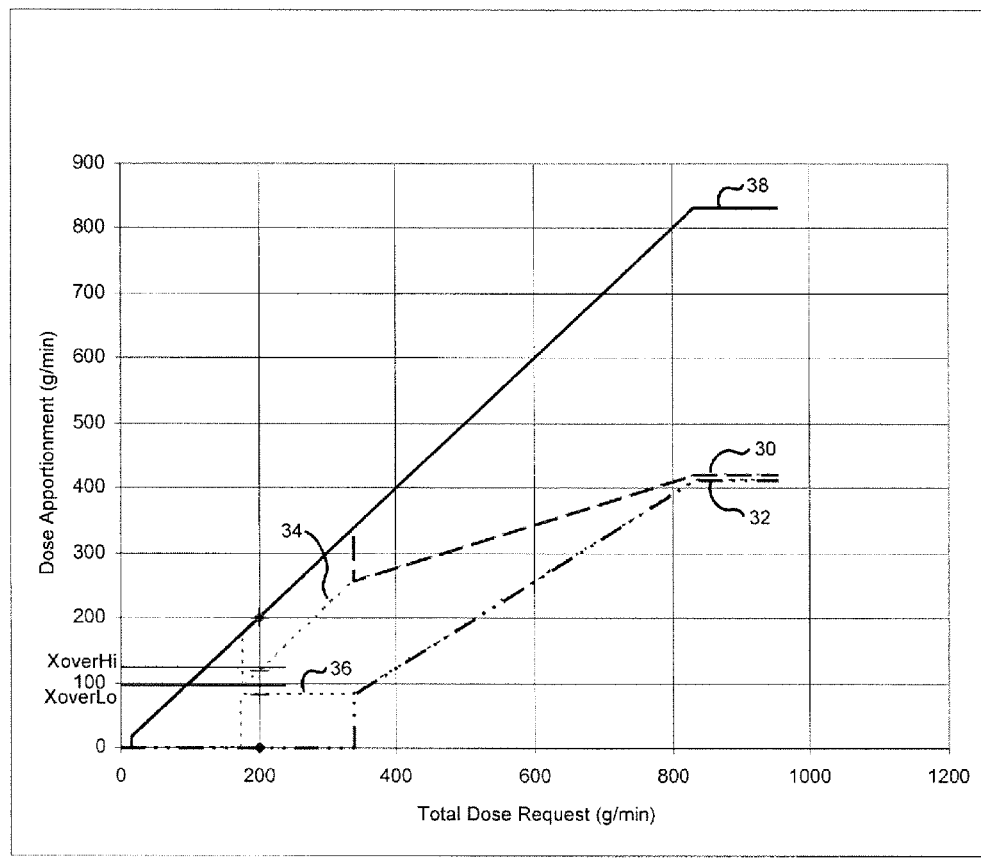
FIG. 3 shows a graph of the apportionment of the flow rate between two injectors under increasing and decreasing load conditions in accordance with an example embodiment of the present invention.

FIG. 3 is a graphical representation of the apportionment of the flow rate between injector 1 and injector 2 for the increase and decrease in load in accordance with the foregoing example. Lines 30 and 32 represent the flow rates of injector 1 and injector 2, respectively, during an increase in load. Lines 34 and 36 represent the flow rates of injector 1 and injector 2, respectively, during a decrease in load. Line 38 represents the total flow rate from both injector 1 and injector 2.

In a further example embodiment, in a vehicle equipped with a dual SCR catalyst system, one catalyst of the precious metal type may be used for low temperature operation (exhaust temperatures less than 200° C.) fed by the lead injector and a second catalyst of the vanadium or zeolite type placed downstream of the low temperature catalyst may be used with the lag injector when temperatures are above 200-250° C.; at which point the lead injector no longer injects reagent into the low temperature catalyst but continues to circulate reagent to keep the injector cool. At certain exhaust temperatures in the 200-250° C. range, both injectors may be operated to maximize NOx reduction and minimize byproduct formation.

It should now be appreciated that the present invention provides advantageous methods and apparatus for reducing NOx emissions using dual injectors.

Although the invention has been described in connection with various illustrated embodiments, numerous modifications and adaptations may be made thereto without departing from the spirit and scope of the invention as set forth in the claims.

What is claimed is:

1. A system for controlling diesel emissions with two or more reagent injectors, comprising:
    a first injector for injecting a first reagent into an exhaust stream from a diesel engine, wherein said first injector is positioned upstream of at least one of a diesel particulate filter and a lean NOx trap;
    a second injector for injecting a second reagent into the exhaust stream, wherein said second injector is positioned downstream of said first injector and upstream of a selective catalytic reduction catalyst, and wherein the second reagent is different from the first reagent;
    a first pump for providing the first reagent to said first injector;

a first tank connected to the first pump and comprising the first reagent;
a second pump for providing the second reagent to said second injector; a second tank connected to the second pump and comprising the second reagent; and
a control unit for controlling the injection of both the first reagent and the second reagent;
wherein said control unit is adapted to receive an alert signal indicative of the second tank reaching a predetermined low level; and
wherein said control unit transmits at least one control signal to stop the injecting of the second reagent and to begin injecting the first reagent upon receiving the alert signal.

2. The system according to claim 1, wherein said control unit generates at least one control signal based on engine operating parameters.

3. The system according to claim 1, wherein said control unit controls the injection by transmitting one or more control signals to each of said first pump and said second pump.

4. The system according to claim 1, wherein said control unit controls the injection by transmitting one or more control signals to each of said first injector and said second injector.

5. The system according to claim 1, wherein the first reagent is a hydrocarbon and the second reagent is urea.

6. The system according to claim 1, wherein the control unit varies an on-time and an injection frequency of each of said first injector and said second injector.

7. The system according to claim 1, wherein each of said first injector and said second injector deliver droplets of about 40 to about 80 micron SMD.

8. A method for controlling diesel emissions using two or more reagent injectors, comprising the steps of:
detecting an engine load of a diesel engine;
injecting a first reagent into an exhaust stream of the diesel engine from a first injector at a first injection frequency when the detected engine load is at or below a first threshold value;
increasing the injection frequency of the first injector to a second injection frequency when the detected engine load increases above the first threshold value; and
initiating the injection of a second reagent into the exhaust stream from a second injector when the detected engine load increases above a second threshold value; and
injecting the second reagent from the second injector at the second injection frequency and injecting the first reagent from the first injector at the second injection frequency when the detected engine load is above the second threshold value.

9. The method according to claim 8,
wherein the first injection frequency is about 1.5 Hz or less;
wherein the first threshold value is about 15%;
wherein the second injection frequency is at least about 10 Hz; and
wherein the second threshold value is about 40%.

10. The method according to claim 8, further comprising the step of:
varying a flow rate of each of the first injector and the second injector.

11. The method according to claim 8, wherein the first reagent and the second reagent are urea.

12. The method according to claim 8, wherein the first reagent and the second reagent are a hydrocarbon.

13. The method according to claim 8, further comprising the steps of:
receiving at a control unit an alert signal indicative of a supply of the second reagent reaching a predetermined low level; and
transmitting from the control unit at least one control signal to stop the injecting of the second reagent and to begin injecting the first reagent upon receiving the alert signal.

14. The method according to claim 8, further comprising the steps of:
increasing an on-time of the first injector as the detected engine load increases from about 1% to about 15% to achieve a first flow rate from the first injector of about 125 grams/minute; and
increasing the on-time of the first injector as the engine load increases to about 40% until the first flow rate is at least about 330 grams/minute.

15. The method according to claim 14, further comprising the steps of:
increasing the first flow rate and increasing a second flow rate from the second injector until a total flow rate of at least 816 grams/minute is achieved.

16. The method according to claim 8, further comprising the steps of:
injecting the first reagent at the second injection frequency and injecting the second reagent at the second injection frequency as the detected engine load decreases to a third threshold value;
stopping injection of the second reagent from the second injector when the detected engine load decreases below the third threshold value; and
decreasing the injection frequency of the first injector to the first injection frequency when the detected load decreases below a fourth threshold value.

17. The method according to claim 16,
wherein the third threshold value is about 21%; and
wherein the fourth threshold value is about 12%.

18. A method of controlling the injection of reagent using two injectors, comprising:
providing one or more fluid supply pumps for providing at least one reagent to a lead injector and a lag injector at pressures of between about 60 psi and 120 psi;
delivering a first reagent from the lead injector at a flow rate of about 0.25 to 600 grams/minute into an exhaust stream of a diesel engine, the exhaust stream including one or more aftertreatment catalysts for NOx and particulate control, wherein the aftertreatment catalyst for NOx control is positioned downstream of the aftertreatment catalyst for particulate control;
delivering a second reagent from the lag injector at a flow rate of about 0.25 to 600 grams/minute into the exhaust stream, wherein the second reagent is different from the first reagent;
controlling the delivery of each of the first reagent and the second reagent from a single control unit;
receiving at the control unit an alert signal indicative of a supply of the second reagent reaching a predetermined low level;
transmitting from the control unit at least one control signal to stop the injecting of the second reagent and to begin injecting the first reagent upon receiving the alert signal; and
wherein each of the lead and lag injectors comprises a single fluid pulse width modulated injector to deliver droplets of about 40 to about 80 micron SMD.

19. The method according to claim 18,
wherein the one or more aftertreatment catalysts include a diesel particulate filter and a selective catalytic reduction catalyst located downstream of the diesel particulate filter;
wherein the lead injector injects a hydrocarbon reagent upstream of the diesel particulate filer; and
wherein the lag injector injects a urea reagent between the diesel particulate filter and the selective catalytic reduction catalyst.

20. The method according to claim 18,
wherein each of the lead injector and the lag injector is configured to provide a percentage on-time about 1% to about 95%, an injection frequency of about 1 Hz to about 10 Hz, a fluid pressure of about 60 psi to about 120 psi, and a circulation rate of about 2.5 to about 10 gallons/hour.

* * * * *

UNITED STATES PATENT AND TRADEMARK OFFICE
CERTIFICATE OF CORRECTION

Page 1 of 1

PATENT NO. : 8,109,077 B2
APPLICATION NO. : 11/870012
DATED : February 7, 2012
INVENTOR(S) : Peter Joseph Reba et al.

It is certified that error appears in the above-identified patent and that said Letters Patent is hereby corrected as shown below:

Col. 3, line 6, "filer" should be -- filter --

Col. 6, line 21, delete "in 20 qr/min"

Col. 11, line 7, claim 19, "filer" should be -- filter --

Signed and Sealed this
Twenty-eighth Day of August, 2012

David J. Kappos
*Director of the United States Patent and Trademark Office*